United States Patent [19]

Aoyama et al.

[11] 3,959,219

[45] May 25, 1976

[54] THERMOPLASTIC RESIN COMPOSITION HAVING REDUCED FLAMMABILITY

[75] Inventors: Toshikazu Aoyama, Nagoya; Yukinori Kimata, Gifu; Hotuma Okasaka, Nagoya; Hiroshi Kodama, Nagoya; Naoya Yoda, Nagoya, all of Japan

[73] Assignee: Toray Industries, Inc., Tokyo, Japan

[22] Filed: Dec. 13, 1974

[21] Appl. No.: 532,524

[30] Foreign Application Priority Data

Dec. 27, 1973 Japan.............................. 48-144230

[52] U.S. Cl. .................... 260/45.75 B; 260/45.7 R; 260/45.8 NT; 260/45.95 G
[51] Int. Cl.$^2$............................................. C08J 3/20
[58] Field of Search.............. 260/45.8 NT, 45.75 B, 260/45.95 G, 45.7 R

[56] References Cited
UNITED STATES PATENTS

| | | |
|---|---|---|
| 3,275,592 | 9/1966 | Oswald et al................ 260/45.8 NT |
| 3,347,822 | 10/1967 | Jenkner ............................ 260/45.7 |
| 3,418,267 | 12/1968 | Busse ........................... 260/45.75 R |
| 3,751,396 | 8/1973 | Gall.................................... 260/40 R |
| 3,775,165 | 11/1973 | Young et al. ................ 260/45.85 R |
| 3,888,819 | 6/1975 | Evans et al.................. 260/45.8 NT |
| 3,888,822 | 6/1975 | Gilleo et al.................. 260/45.8 NT |

*Primary Examiner*—V. P. Hoke

[57] ABSTRACT

This invention relates to a thermoplastic resin composition having reduced flammability which comprises a flammable thermoplastic resin, a flame-retarding agent composed of combined halogenated aromatic compound and an organic compound having a cyanurate or isocyanurate ring structure.

The composition has well-balanced physical properties and has an especially good external appearance and elongation together with flame resistance.

6 Claims, No Drawings

THERMOPLASTIC RESIN COMPOSITION HAVING REDUCED FLAMMABILITY

BACKGROUND OF THE INVENTION

This invention relates to a thermoplastic resin composition having reduced flammability, which can be molded to form a shaped article having excellent physical properties. Thermoplastic resins such as polypropylene, polystyrene, ABS resin, Nylon, polyester and polycarbonate have a variety of excellent physical properties, and therefore have been used as engineering plastics such as raw materials for mechanical parts of various machines, electrical equipment and parts of motor cars. Recently those engineering plastics have been subjected to a strong desire for security in case of fire, that is flame resistivity, in addition to well-balanced physical and chemical properties. It is currently indispensable to impart flame resistance to a thermoplastic resin, if the resin is to enlarge its use as an engineering plastic.

Heretofore, organic polymers have been made flame resistant by adding a flame retarding agent such as organic halogen compound, phosphorus compounds, large amounts of inorganic materials, and their combination. Generally speaking, however, the addition of flame retarding agents deteriorates the physical properties, of the organic polymer especially durability. It is of practical importance to find a good combination of organic polymer and flame retarding agent.

In the case of thermoplastic resins, the above mentioned method using a large amount of inorganic compound has met with difficulties in blending the resin with the flame retarding agent to obtain a uniform mixture. In the use of a phosphorus compound as a flame retarding agent, it is difficult to obtain a mixture containing a sufficient amount of phosphorus compound to impart flame resistance to the resin. For these reasons, the organic halogen compounds are used in actual practice as flame retarding agents solely or together with an auxiliary flame retarding agent such as antimony trioxide.

Among the organic halogen compounds, aliphatic halogen compounds such as chlorinated paraffin and hexabromocyclododecane do not have enough heat-stability. The aliphatic halogen compounds are likely to cause fuming and odors when they are blended with a thermoplastic resin at a temperature higher than 200°C. Such a phenomenon often results in deterioration of the physical properties of the base polymer.

On the other hand, the halogenated aromatic compounds such as decabromodiphenyl and decabromodiphenylether etc. have high heat-stability, and therefore the above mentioned problems scarcely take place on blending with thermoplastic resin. They, however, have a very high melting point and low solubility in resin. For this reason those compounds are likely to cause deterioration of the physical properties of the resin due to its non uniform dispersion in the resin.

Thus, an object of this invention is to provide a thermoplastic resin composition having reduced flammability together with well-balanced physical properties.

Another object of the invention is to impart flame resistance to a thermoplastic resin without deteriorating its physical properties by using a cyanurate combined with a halogenated aromatic compound as a flame retarding agent.

SUMMARY OF THE INVENTION

We now have found that a thermoplastic resin composition comprising 100 parts by weights of a flammable thermoplastic resin, 3 to 30 parts by weight of a halogenated aromatic compound and 0.3 to 20 parts by weight of a compound having a cyanurate and/or an isocyanurate ring structure has reduced flammability together with well-balanced physical properties, especially good external appearance and elongation.

The flammable thermoplastic resins used in the present invention are polyethylene, polypropylene, ethylene-vinylacetate copolymer, polystyrene, ethylene-ethylacrylate copolymer, ABS resin, polyvinylchloride, Nylon-6, Nylon-6,6, polyethyleneterephthalate, polybutyleneterephthalate, polyethylene-2,6-naphthalate, polybutylene-2,6-naphthalate, polycyclohexylene dimethyleneterephthalate, polycyclohexylenedimethyleneterephthalate-isophthalate copolymer, polycarbonate, acetyl celulose resin, styrene-polyphenylene oxide resin, etc.

These polymers may contain more than 70 weight % of the main monomer component. A copolymer having a minor amount of other monomers may also be used in the present invention. Among these thermoplastic resins, polyethyleneterephthalate, polybutyleneterephthalate, Nylons and ABS resin are preferably used. Polybutyleneterephthalate is most preferable.

To these polymers, a halogenated aromatic compound and a compound having a cyanurate and/or an isocyanurate ring structure are added according to the present invention.

The compound having cyanurate and/or an isocyanurate ring structure can be represented by the following formulae I and II.

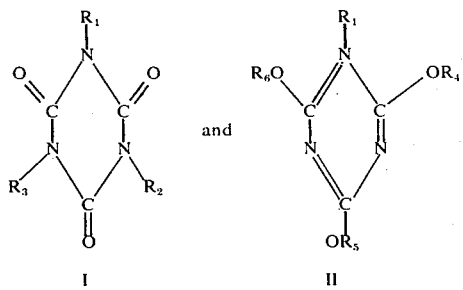

wherein $R_1$, $R_2$, $R_3$, $R_4$, $R_5$ and $R_6$ are same or different groups selected from the group consisting of hydrogen, β-hydroxyethyl, β-acyloxyethyl, β-carboxyethyl, 2,3-dibromopropyl, phenyl, benzyl, β-acetoxyethyl, β-benzoxyethyl, acetyl, tribromophenyl, propyl, butyl, 2,3-epoxypropyl, β-phenoxyethyl and cresyl. and $R_1$, $R_2$, $R_3$, $R_4$, $R_5$ and $R_6$ may also be divalent groups interconnected with each two cyanurate and/or isocyanurate rings and thereby constitute a molecule containing plurality of those rings. Thus, the examples of formulae I and II are as follows,: tris(β-hydroxyethyl) isocyanurate, tris(β-carboxyethyl)isocyanurate tris(2,3-dibromopropyl) isocyanurate, triphenylisocyanurate, tribenzylisocyanurate, lower aliphatic acid esters of tris(β-hydroxyethyl)isocyanurate, benzoic acid ester of tris (β-hydroxyethyl)isocyanurate phenyl ester of tris(β-carboxyethyl)isocyanurate, tributylisocyanurate, diphenylmethylisocyanurate, dipropylphenylisocyanurate, triacetylisocyanurate, tribenzoylisocyanurate, tri(phenylcarbamine)-isocyanurate, tricarboethoxyisocyanurate, isocyanuric acid, cyanuric acid, triphenylcyanurate, tris(tribromophenyl)-cyanurate, tripropylcyanurate, tributylcyanurate triacetylcyanurate, tribenzoylcyanurate, tri(phenylcarbamyl)-cyanurate, tricresylcyanurate, tris(2,3-epoxypropyl)isocyanurate. and a lower alkyl urethane of cyclis tri- to hexamer of tolylene diisocyanate.

A compound having a cyanurate and/or isocyanurate ring is added to a thermoplastic resin together with a halogenated aromatic compound in an amount of 0.3 to 20 parts by weight, preferably 0.5 to 10 parts by weight par 100 parts by weight of the thermoplastic resin. An amount of lower than 0.3 parts by weight of the compound does not have enough effect to uniformly disperse the halogenated aromatic compound in the thermoplastic resin, and therefore good external appearance and elongation property can not be obtained. An amount of more than 20 parts by weight of the compound is effective for uniform dispersion of the halogenated aromatic compound, but deteriorates the elongation properties of the thermoplastic resin composition.

The halogenated aromatic compound used as a flame-retarding agent in the present invention may be exemplified as follows, i.e. decabromodiphenyl, nonabromodiphenyl, octabromodiphenyl, decabromodiphenylether, decachlorodiphenylether, nonabromodiphenylether, octabromodiphenylether, hexabromobenzene, tetrabromophthalicanhydride, tetrachlorophthalicanhydride, tetrabromophthalimide, octabromonaphthalene, tetrabromobisphenol A bis(2,3-dibromoether) and hexabromodiphenylether.

Polycarbonates, polyesters and polyphosphonates containing, tetrabromobisphenol as a monomer component, and vinyl polymers containing tribromophenylacrylate as a monomer unit, may be also used as flameretarding agents.

The thermoplastic resin composition of the present invention may optionally contain an auxiliary flame-retarding agent such as antimony trioxide, tin oxide, aluminum hydroxide and zirconium oxide.

The amounts of the halogenated aromatic compound and the auxiliary flame-retarding agent are 3 to 30 parts, preferably 5 to 26 parts, by weight, and about 1 to 15 parts by weight on the basis of 100 parts by weight of the thermoplastic resin, respectively.

The composition of the present invention may be produced by conventional blending methods. For example, methods involving mechanically blending a granular thermoplastic resin, or using a heated roll or melt blending methods or blending methods utilizing mixing in a solution followed by evaporation of solvent, may be adopted. Before or during production of the thermoplastic resin, those additives may be added. An especially preferable method is to mix the above mentioned components in the form of granules and/or powder thereafter to melt-blend the mixture in a molding apparatus, or to directly shape the same.

The thermoplastic resin composition having a reduced flammability, in accordance with the present invention may further contain other ordinary flame-retarding agents, dyes, coloring agents such as pigments, crystallizing agents, fillers, reinforcing agents, lubricants, plasticizers, heat resistant agents, absorbers of ultraviolet rays, mold release agents, expanding agents, and organic materials such as thickeners and inorganic materials.

The thermoplastic resin compositon of the present invention can be shaped according to conventional methods such as extrusion moulding, injection moulding and press moulding.

The following examples further illustrate the present invention, but they are not intended to limit it thereto.

In the examples, phr means parts by weight "per" 100 parts by weight of base thermoplastic resin.

Example 1

Polybutylene terephthalate (abbreviated as PBT) having an intrinsic viscosity of 1.20 (0-chlorophenol solu. at 25°C) was mixed with organic flame retardant, synergistic agent and triphenylcyanurate using a Henschel Mixer, and extruded at 240°C into pellets using a 30 mm$\phi$ extruder. These pellets were dried at 130°C for 5 hrs in a vacuum and subsequently injection molded into ⅛ inch $t$ dumbbell type tensile test specimens and ⅛ inch $t$ flammability test specimens. These specimens were tested for tensile elongation at break and flame resistance by the method described in ASTM D-638, D-635 and Underwriters laboratory's subject No. 94. Surface appearances of ⅛ inch $t$ tensile test specimens were judged by visual observation. The results obtained are summarized in Table 1.

Table 1

| | Blend composition (phr) | | | Elongation at break(%) | Flammability | | Surface Appearance |
|---|---|---|---|---|---|---|---|
| PBT | Flame Retardant | Sb$_2$O$_3$ | Triphenyl cyanurate | | ASTM D-635 *2 | UL-94 | *3 |
| 100 | 0 | 0 | 0 | 240 | SB | 94HB | O |
| 100 | DBE12 | 6 | 0 | 6 | NB | 94VE-0 | X |
| 100 | DBE12 | 6 | 1 | 52 | NB | 94VE-0 | O |
| 100 | DBE12 | 6 | 3 | 95 | NB | 94VE-0 | O |
| 100 | DBE12 | 6 | 5 | 108 | NB | 94VE-0 | O |
| 100 | DBE12 | 6 | 10 | 81 | NB | 94VE-0 | O |
| 100 | DBE12 | 6 | 20 | 32 | NB | 94VE-0 | O |
| 100 | DBE12 | 6 | 3*1 | 251 | NB | 94VE-0 | O |
| 100 | DBB12 | 6 | 0 | 8 | NB | 94VE-0 | X |
| 100 | DBB12 | 6 | 1 | 46 | NB | 94VE-0 | Δ |
| 100 | DBB12 | 6 | 3*1 | 80 | NB | 94VE-0 | O |
| 100 | DBB12 | 6 | 6 | 98 | NB | 94VE-0 | O |
| 100 | DBB12 | 6 | 3 | 232 | NB | 94VE-0 | O |
| 100 | DBE24 | 0 | 0 | 8 | NB | 94VE-0 | X |
| 100 | DBE24 | 0 | 5 | 97 | NB | 94VE-0 | O |

*1 "Epikote" 815 (Shell chem. Co., Ltd.) 0.5 phr addition
*2 SB : Slow Burning NB ; Non Burning
*3 The symbols in surface appearance have the following meaning ;
  O : good
  Δ : poor with small amount of dotted spots
  X : wrong with large amount of dotted spots Table 1-continued

| Blend composition (phr) | | | | Elongation at break(%) | Flammability | | Surface Appearance |
|---|---|---|---|---|---|---|---|
| PBT | Flame Retardant | $Sb_2O_3$ | Triphenyl cyanurate | | ASTM D-635 *2 | UL-94 | *3 |
| 100 | 0 | 0 | 0 | 240 | SB | 94HB | O |

In Table 1 the flame retardants used are signified as follows:
  DBE : decabromodiphenyloxide
  DBB : decabromodiphenyl As shown in Table 1, PBT alone has little flame resistance and simply compounded PBT extruded with halogenated aromatic compounds like DBE or DBB solely or further with antimony trioxide gives too low tensile elongation at break for practical use, while further addition of cyanurate compounds, like triphenyl cyanurate improves tensile elongation at break and surface appearance excellently in less than 20 Phr triphenylcyanurate addition. Further addition of epoxy compounds to this flame resistant system improves tensile elongation at break excellently.

EXAMPLE 2

PBT having an intrinsic viscosity of 1.18, DBE and various kinds of (iso)cyanurate compounds were mixed in compositions given below and extruded into pellets, and then injection molded into test specimens in the same manner as described as Example 1. These specimens prepared were tested for tensile elongation at break and flammability.

The results are summarized in Table 2.
The components in the blend were;

| | |
|---|---|
| PBT | 100 phr |
| DBE | 12 phr |
| $Sb_2O_3$ | 6 phr |
| and (iso)cyanurate compounds | 3 phr |

Table 2

| (iso)cyanurate compounds | Elongation at break (%) | Flammability | |
|---|---|---|---|
| | | ASTM D-635 | UL-94 |
| not added | 6 | NB | 94VE-0 |
| Triphenylcyanurate | 95 | NB | 94VE-0 |
| Tris(2,3-dibromopropyl)isocyanurate | 105 | NB | 94VE-0 |
| Tris(2,3-epoxypropyl)isocyanurate | 102 | NB | 94VE-0 |
| Tristolylisocyanurate | 85 | NB | 94VE-0 |
| Trisbenzylisocyanurate | 94 | NB | 94VE-0 |
| Tris($\beta$-acetoxyethyl)isocyanurate | 98 | NB | 94VE-0 |
| Tris($\beta$-benzoxyethyl)isocyanurate | 82 | NB | 94VE-0 |
| Tris($\beta$-hydroxyethyl)isocyanuratetriphenylurethane | 101 | NB | 94VE-0 |
| Tris($\beta$-carbomethoxyethyl)isocyanate | 93 | NB | 94VE-0 |
| Tristolylcyanurate | 84 | NB | 94VE-0 |

As shown in Table 2, many kinds of (iso)cyanurate compounds improve tensile elongation at break of flame-resistant PBT using DBE as an effective flame retardant.

Example 3

Polyethylene terephthalate (abbreviated as PET) having an intristic viscosity of 0.86, DBE, $Sb_2O_3$ and triphenylcyanurate were mixed in compositions given in Table 3, and extruded into pellets at 280°C using a 30mm$\phi$ extruder. These pellets were dried at 130°C for 5 hrs in an air oven and were subsequently injection molded into test specimens in the same manner as Example 1. Tensile elongation at break and flammability were tested with these specimens. The results obtained are summarized in Table 3.

Table 3

| Blend composition (phr) | | | | Elongation at break (%) | Flammability | | Surface Appearance |
|---|---|---|---|---|---|---|---|
| PET | Flame Retardant | $Sb_2O_3$ | Triphenyl cyanurate | | ASTM D-635 | UL-94 | |
| 100 | 0 | 0 | 0 | 60 | SB | 94HB | O |
| 100 | DBE12 | 4 | 0 | 6 | NB | 94VE-0 | X |
| 100 | DBE12 | 4 | 1 | 36 | NB | 94VE-0 | Δ |
| 100 | DBE12 | 4 | 3 | 53 | NB | 94VE-0 | O |
| 100 | DBE12 | 4 | 5 | 54 | NB | 94VE-0 | O |
| 100 | DBB12 | 4 | 0 | 5 | NB | 94VE-0 | X |
| 100 | DBB12 | 4 | 3 | 55 | NB | 94VE-0 | O |

Table 3 indicates that (iso)cyanurate compounds clearly improve tensile elongation at break, not only of the flame resistant PBT but also that of the PET.

Example 4

Bisphenol A type polycarbonate (abbreviated as PC) having an intrinsic viscosity 0.60 (p-dioxane solu. at 25°C), DBB, $Sb_2O_3$ and triphenylcyanurate were mixed as in compositions shown Table 4 and extruded at 290°C into pellets using a 30 mm$\phi$ extruder. These pellets were dried at 120°C for 5 hrs in an air oven and were subsequently injection molded into flammability test specimens, tensile test specimens and 1/2 t Izod impact test specimens, and were then tested in the same manner as Example 1 and by ASTM D-256. The results appear in Table 4.

As shown in table 6, even in the case of flame resistant ABS, the (iso)cyanurate compound improves the Izod impact strength effectively.

Table 4

| Blend composition (phr) | | | | Tensile elongation at break (%) | Izod Impact strength (kg.cm/cm) | Flammability | |
|---|---|---|---|---|---|---|---|
| PC | DBB | $Sb_2O_3$ | Triphenyl cyanurate | | | ASTM D-635 | UL-94 |
| 100 | 0 | 0 | 0 | 94 | 12.5 | SB | 94HB |
| 100 | 10 | 0 | 0 | 8 | 4.2 | NB | 94VE-0 |
| 100 | 10 | 0 | 3 | 95 | 11.8 | NB | 94VE-0 |
| 100 | 10 | 0 | 5 | 92 | 11.5 | NB | 94VE-0 |
| 100 | 10 | 2 | 5 | 87 | 10.9 | NB | 94VE-0 |

As shown in Table 4, even in the case of flame resistant PC, using (iso)cyanurate compounds gives higher tensile elongation at break and higher impact strength than those without such use.

Example 5

Nylon 66 (abbreviated as N-66) having a relative viscosity of 2.98 (1 g/dl conc. $H_2SO_4$ solution at 25°C), DBE,$Sb_2O_3$ and triphenylcyanurate were mixed as compositions described in Table 5 and were extruded at 280°C into pellets using a 30mmφ extruder. These pellets were dried at 100°C in a vacuum overnight and were injection molded at 280°C into flammability test bars and tensile test specimens. The tests were conducted in the same manner as Example 1 and the results appearing in Table 5 were obtained.

Table 5

| Blend composition (phr) | | | | Elongation at break (%) | Flammability | |
|---|---|---|---|---|---|---|
| N-66 | DBE | $Sb_2O_3$ | Triphenyl cyanurate | | ASTM D-635 | UL-94 |
| 100 | 0 | 0 | 0 | 93 | SE | 94VE-2 |
| 100 | 25 | 10 | 0 | 2 | NB | 94VE-0 |
| 100 | 25 | 10 | 5 | 50 | NB | 94VE-0 |

The results indicate that even in the case of flame resistant N-66, (iso)cyanurate compound is effective for improving:ts tensile elongation at break.

EXAMPLE 6

ABS resin ("TOYOLAC" T100, sold by TORAY INDUSTRIES, INC.), DBE, $Sb_2O_3$ and tris($\beta$-hydroxylethyl)isocyanurate(abbreviated as THEIC) were mixed in compositions given in Table 6 and extruded at TOYOLAC 220°C into pellets using a 30mmφ extruder. These pellets were dried at 80°C in an air oven and were injection molded at 220°C into flammability test bars and Izod impact conducted specimens. The tests were tried in the same manner as described hereinabove and the results appearing in Table 6 were obtained.

Table 6

| Blend composition (phr) | | | | Izod impact strength (kg.cm/cm) | Flammability | |
|---|---|---|---|---|---|---|
| ABS | DBE | $Sb_2O_3$ | THEIC | | ASTM D-635 | UL-94 |
| 100 | 0 | 0 | 0 | 16.5 | SB | 94HB |
| 100 | 12 | 3 | 0 | 4.3 | SE | 94VE-2 |
| 100 | 12 | 3 | 3 | 11.2 | SE | 94VE-2 |
| 100 | 26 | 10 | 0 | 3.8 | NB | 94VE-0 |
| 100 | 26 | 10 | 5 | 8.8 | NB | 94VE-0 |

What we claim:

1. A thermoplastic resin composition having reduced flammability which comprises 100 parts by weight of a flammable thermoplastic polymer, 3 to 30 parts by weight of a flame retarding agent consisting of a halogenated aromatic compound and 0.3 to 20 parts by weight of an organic compound having acyanurate or isocyanurate ring structure, represented by the general formulas

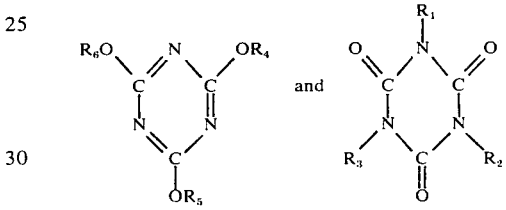

wherein $R_1$, $R_2$, $R_3$, $R_4$, $R_5$ and $R_6$ are same or different radicals selected from the group consisting of hydrogen, -hydroxyethyl, -carboxyethyl, 2,3-dibromopropyl, phenyl, benzyl, tolyl, -acetoxyethyl, -benzoxyethyl, acetyl, tribromophenyl, propyl, butyl, 2,3-epoxypropyl, -phenoxyethyl and cresyl, and wherein the flammable thermoplastic polymer is selected from the group consisting of polycarbonate, polyester, polyamide and acrylonitrile-butadiene-styrene polymer.

2. The composition of claim 1 wherein the organic compound having a cyanurate or an isocyanurate ring structure is selected from the group consisting of triphenyl isocyanurate, tris(2,3-dibromopropyl) isocyanurate, tris(-hydroxyethyl) isocyanurate, tris(2,3-epoxypropyl) isocyanurate and tricresyl cyanurate.

3. The composition of claim 1 wherein the flammable thermoplastic resin is polybuthyleneterephthalate.

4. The composition of claim 1 wherein the halogenated aromatic compound is selected from the group consisting of decabromo diphenylether and decabromodiphenyl.

5. The composition of claim 1 which further contains 1 to 15 parts by weight of an auxiliary flame-retarding agent per 100 parts by weight of the thermoplastic resin.

6. The composition of claim 5 wherein the auxiliary flame-retarding agent is antimony oxide.

* * * * *